Nov. 25, 1930.  S. G. DOWN  1,782,566
AUTOMOTIVE BRAKE
Filed March 12, 1927
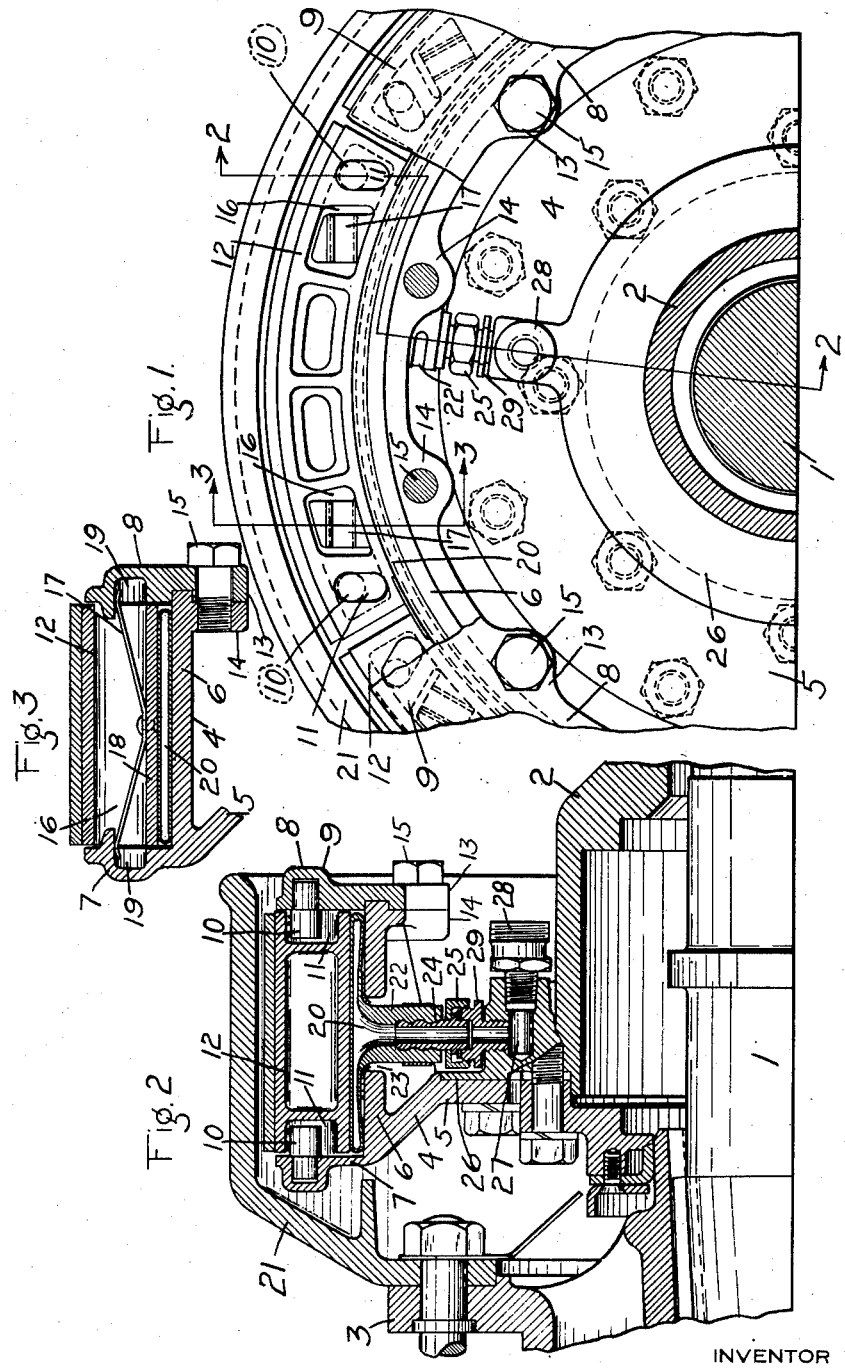
INVENTOR
SIDNEY G. DOWN
BY *Wm. M. Cady*
ATTORNEY Patented Nov. 25, 1930

1,782,566

UNITED STATES PATENT OFFICE

SIDNEY G. DOWN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

AUTOMOTIVE BRAKE

Application filed March 12, 1927. Serial No. 174,929.

This invention relates to brakes for automotive vehicles and more particularly to that type of brake in which each one of any desired member of vehicle wheels have a brake drum, and within each brake drum there are a plurality of radially arranged brake shoes which are operatively carried by a non-rotating brake support secured to any suitable part of the vehicle and are movable into or out of operative engagement with the interior braking surface of the brake drum by suitable means interposed between the brake support and the shoes, and has for an object the provision of means for facilitating the removal or replacement of the brake shoes as well as the means for operating them, without removing the brake drum or the brake support.

Another object of the invention is to provide an automotive vehicle brake support having means for assisting in effecting an interlocking of the brake shoes with the brake support, which means may be removed from the brake support to break the interlocking feature and thus facilitate the removal and replacement of the brake shoes and associated parts which are mounted on the brake support.

Another object of the invention is to provide novel means for returning the brake shoes of an automotive vehicle brake to their normal released position and for maintaining the shoes in this position against accidental movement.

A further object of the invention is to provide an automotive vehicle brake having novel fluid pressure connections so associated with the brake support and the expansible tube, mounted thereon, for operating the brake shoes, that the connecting and disconnecting of the tube is rendered possible without removing the brake drum or the brake support thus greatly facilitating the removal or replacement of the expansible tube.

Referring to the drawing in which like reference characters refer to like parts, Fig. 1 is a cross sectional view taken through an axle and axle housing of an automotive vehicle, the brake support and associated parts being shown in elevation, a portion of a removable ring member of the brake support being shown broken away to more clearly illustrate the invention; Fig. 2 is a sectional view taken on the line 2—2 of Fig. 1, the removable ring member of the brake support being shown, and Fig. 3 is a sectional view taken on the line 3—3 of Fig. 1, the removable ring member of the brake support being shown and the brake drum being omitted.

Referring now in detail to the drawing, the reference character 1 indicates an automotive vehicle axle which extends through the usual housing 2 and has mounted thereon the usual wheels, the hub 3 of one of which has been shown. Secured to each end of the housing 2, or formed integral therewith, there is a brake support 4 comprising a substantially vertically disposed web 5 and a horizontally disposed web or flange 6. Extending outwardly from the web 6, at one side of the brake support, there is a flange 7 and at the opposite side of the support there is a ring member 8 which extends outwardly beyond the web 6 and forms in effect a flange 9 for this side of the support. The flange 7 is provided with horizontally disposed projections 10 which extend into slots 11 formed in one side of brake shoes 12 and the flange 9 is provided with like projections which extend into slots 11 formed at the other sides of the shoes. The ring member 8 has inwardly extending lugs 13 which are secured to corresponding lugs 14 on the brake support 4 by bolts 15 or any other suitable removable securing means. The brake shoes 12 are radially arranged around the brake support 4 and are positioned between the flanges 7 and 9 so that the projections 10 on these flanges will cooperate with the brake shoes in such a manner that the shoes are permitted to be moved outwardly and inwardly relative to the brake support, to respectively apply and release the brake, and are prevented from moving endwise, i. e., in directions around the brake support.

Each of the brake shoes 12 has open ended channels or openings 16 formed thereacross, through which channels, resilient members 17 pass, such members, intermediate their ends, being secured to a web 18 of the shoe.

The ends of these members slope upwardly from the web 18 and extend outwardly beyond the sides of the shoe into engagement with the flanges 7 and 9 within slots 19 formed in such flanges. These resilient members are for the purpose of forcing the brake shoes to their released positions, there being sufficient initial compression provided in the members to maintain the shoes in their released positions against accidental movement.

Interposed between the webs 18 of the brake shoes and the web 6 of the brake support 4, there is an expansible tube 20 which is adapted to be expanded by fluid pressure from any suitable source, and when being so expanded will force the brake shoes 12 outwardly until the brake shoes frictionally engage the inner braking surface of a brake drum 21 secured to the wheel hub 3. The tube 20 is mounted on the web 6 of the brake support and has an inlet stem or hose 22 which extends through an opening 23 formed in the web 6. The end portion of this hose has connected therewith a part 24 of a union, which part comprises a rotatable tightening nut 25, the use of which will hereinafter be described. The opening 23 in the web 6 is of such a size that the part 24 of the union can be passed therethrough, thus permitting this part of the union to be secured to the end of the hose before the tube 20 is mounted on the brake support 4.

In the present embodiment of the invention, the axle housing 2, adjacent each of its ends, is provided with a flange 26 to which the brake support 4 is secured. This flange is provided with a horizontal passage 27 through which fluid pressure may flow, the outer end of such passage being connected with a suitable pressure supply pipe or hose (not shown) through the medium of a fitting 28, one end of such fitting being mounted in the flange 26. Adjacent the fitting 28 and extending vertically relative thereto, there is mounted on the flange 26 a part 29 of a union which provides a passage therethrough from the passage 27. The outer portion of the part 29 is screw threaded and is adapted to be engaged by the tightening nut 25 of the part 24 to connect the tube 20 with the fluid pressure supply pipe or hose.

From the foregoing description it will be noted that the brake shoes 12 are effectively interlocked, in their operative positions, with the brake support 4 and that by the removal of the member 8 this interlocking feature is removed and the brake shoes may be removed or replaced without removing the brake drum or the support 4. When the member 8 and shoes 12 are removed the tube 20 may also be removed from the support without removing the brake drum or disconnecting the support from the axle. To remove the tube 20 from the support, the nut 25 is disconnected from the part 29 of the union, then the tube is moved across the web 6 of the support and causing the hose 22 and part 24 of the union to pass through the opening 23 in such web. When the member 8 and shoes 12 are removed from the support 4, the web 6 will present a surface devoid of projections, thus rendering it possible to remove or replace the tube 20 without having to stretch it.

It will be apparent to those skilled in the art to which this invention appertains that changes may be made in the details and arrangement of the several parts forming the invention without departing from the spirit and scope of the appended claims.

Having now described my invention, what I claim as new and desire to secure by Letters Patent, is:—

1. In an automotive vehicle brake, the combination with a brake drum therefor, of a support for a portion of said brake, brake shoes mounted on said support and movable into and out of engagement with said drum, and means removable from said support for rendering said shoes removable from said support without removing said brake drum.

2. In an automotive vehicle brake, the combination with a brake drum therefor, of a support for a portion of said brake, brake shoes interposed between said support and drum and carried by said support, and means removable from said support for permitting said shoes to be removed sidewise from between said support and brake drum.

3. In an automotive vehicle brake, the combination with a brake drum therefor, of a support for a portion of said brake, spaced flanges projecting from said support, and brake shoes arranged between said flanges adapted to engage the interior braking surface of said brake drum, one of said flanges being removable from said support to permit the sidewise removal of said shoes from between said support and braking surface of said drum.

4. In an automotive vehicle brake, the combination with a brake drum therefor being open at one end, of a support for a portion of said brake, a flange projecting from said support, a ring member having a portion projecting beyond said support and forming in effect a flange spaced away from the first mentioned flange, brake shoes mounted between said flange and projecting portion of said ring member adapted to be moved into and out of engagement with said drum, and removable means accessible through the open end of said drum for securing said ring member to said support.

5. In an automotive vehicle brake, the combination with a support for a portion thereof, of spaced flanges on said support, brake shoes between said flanges and movable relative thereto, and resilient means projecting beyond the sides of said shoes and engaging said flanges to move said shoes to their released positions.

6. In an automotive vehicle brake, the combination with a brake drum therefor, of a support for a portion of said brake, said support having a horizontally disposed annular web, a flange projecting therefrom, brake shoes adapted to interlock at one side with said flange, fluid pressure operated means mounted on said web for moving said shoes into engagement with said drum, and a member secured to said support adapted to interlock with the other sides of said shoes, said member being removable from said support to permit the removal of said shoes and means without removing said drum.

7. In an automotive vehicle brake, the combination with a brake drum therefor, of a support for a portion of said brake, said support being within the drum but not connected therewith, brake shoes within the drum and mounted on said support, means for moving said shoes into engagement with the interior of said drum, and means removable from said support whereby said shoes and means for operating them may be removed or replaced without moving said drum or support from their proper operative positons.

8. In an automotive vehicle brake, the combination with a brake drum therefor, of a support for a portion of said brake, said support being arranged within but independent of said drum, said support and drum defining a recess open at one side, brake shoes insertable into said recess through said open end, and means removably secured to said support for closing the open end of said recess when said shoes are in said recess.

9. In an automotive vehicle brake, the combination with a support for a portion thereof, of brake shoes carried by said support, a flange on said support for preventing sidewise movement of said shoes in one direction, a member secured to said support to prevent sidewise movement of the shoes in the opposite direction, and means projecting from the sides of said shoes into engagement with said flange and member adapted to move said brake shoes to their released positions.

10. In an automotive vehicle brake, the combination with a vehicle part having a passage formed therein for fluid pressure, a brake support associated with said part, a horizontally disposed annular web for said support, said web having an opening formed therein, flanges projecting outwardly from said web, one of said flanges being removable, brake shoes carried by said support, fluid pressure operated means for operating said shoes, a hollow stem for said means extending through said opening and a separable connection for coupling said stem and vehicle part to provide a passage to said means for fluid under pressure, said shoes and means being removable sidewise from said support and a portion of said coupling being removable through said opening with said stem.

11. In an automotive vehicle brake, the combination with an axle housing, of a brake drum open at one end, a support for a portion of the brake carried by said housing and disposed within said drum, a brake shoe carried by said support and operative into and out of engagement with said drum, and means for interlocking said shoe with said support and comprising a member disposed longitudinally of said shoe and removably carried by said support, said means being applicable to and removable from said support through the open end of said drum.

12. In an automotive vehicle brake, the combination with an axle housing, of a brake drum open at one end, a support for a portion of the brake carried by said housing and disposed within said drum, a brake shoe carried by said support and operative into and out of engagement with said drum, and means for interlocking said shoe with said support and comprising a member disposed longitudinally of said shoe and removably carried by said support, said means comprising a plate accessible for application and removal to and from said support through the open end of said drum.

13. In an automotive vehicle brake, the combination with an axle housing, of a brake drum open at one end, a support for a portion of the brake carried by said housing and disposed within said drum, a flange integral with said support, a flange secured to said support and accessible for application and removal to and from said support through the open end of said drum, and brake shoes interlocked with said flanges.

14. In an automotive vehicle brake, the combination with an axle housing, of a brake drum open at one end, a support for a portion of the brake carried by said housing and disposed within said drum, spaced flanges on said support, and a brake shoe carried by said support and interlocked with said flanges, one of said flanges being removable from said support through the open end of said drum to render the brake shoe accessible for removal through the open end of the drum.

In testimony whereof I have hereunto set my hand.

SIDNEY G. DOWN.